(12) United States Patent
Ligander et al.

(10) Patent No.: US 10,236,551 B2
(45) Date of Patent: Mar. 19, 2019

(54) ELECTRICALLY TUNEABLE WAVEGUIDE STRUCTURE

(71) Applicant: TELEFONAKTIEBOLAGET LM ERICSSON (PUBL), Stockholm (SE)

(72) Inventors: Per Ligander, Göteborg (SE); Lars Bolander, Mölndal (SE); Ove Persson, Hunnebostrand (SE); Anatoli Deleniv, Mölndal (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 7 days.

(21) Appl. No.: 15/519,291

(22) PCT Filed: Oct. 15, 2014

(86) PCT No.: PCT/EP2014/072157
§ 371 (c)(1),
(2) Date: Apr. 14, 2017

(87) PCT Pub. No.: WO2016/058642
PCT Pub. Date: Apr. 21, 2016

(65) Prior Publication Data
US 2017/0244146 A1    Aug. 24, 2017

(51) Int. Cl.
*H01P 3/12*  (2006.01)
*H02K 7/06*  (2006.01)
*H01P 1/201* (2006.01)
*H01P 1/207* (2006.01)

(52) U.S. Cl.
CPC ............... *H01P 3/12* (2013.01); *H01P 1/207* (2013.01); *H01P 1/2016* (2013.01); *H02K 7/06* (2013.01)

(58) Field of Classification Search
CPC .............. H01P 3/12; H01P 1/207; H02K 7/06
See application file for complete search history.

(56) References Cited

U.S. PATENT DOCUMENTS 5,808,528 A    9/1998  Griffith et al.

FOREIGN PATENT DOCUMENTS

| CN | 103891041 A | 6/2014 |
| EP | 1 885 018 A1 | 2/2008 |
| WO | WO 2012/016584 A1 | 2/2012 |

*Primary Examiner* — Robert J Pascal
*Assistant Examiner* — Kimberly E Glenn

(57) ABSTRACT

The present invention relates to a tuneable waveguide structure comprising a first, second, third and fourth electrically conducting inner wall. The first inner wall and the second inner wall are facing each other, and the third inner wall and the fourth inner wall are facing each other, the intended extension of the electrical field is parallel to the first inner wall and the second inner wall, and perpendicular to the third inner wall and the fourth inner wall. The waveguide structure comprises at least one tuning device that comprises a wall part that is movably arranged along an extension that is perpendicular to the intended extension of the electrical field. Each wall part is at least indirectly connected to support rods that are in sliding engagement with a corresponding sloped surface that is laterally adjustable in the extension of the slope. Each wall part may be constituted by an electrically conducting foil.

14 Claims, 5 Drawing Sheets

ELECTRICALLY TUNEABLE WAVEGUIDE STRUCTURE

This application is a 371 of International Application No. PCT/EP2014/072157, filed Oct. 15, 2014, the disclosure of which is fully incorporated herein by reference.

TECHNICAL FIELD

The present invention relates to a tuneable waveguide structure having a longitudinal extension and comprising a first inner wall, a second inner wall, a third inner wall and a fourth inner wall. The inner walls are constituted by respective main surfaces and are electrically conducting, where the first inner wall and the second inner wall are facing each other, and where the third inner wall and the fourth inner wall are facing each other. The intended extension of the electrical field is parallel to the main surfaces of the first inner wall and the second inner wall, and the intended extension of the electrical field is perpendicular to the main surfaces of the third inner wall and the fourth inner wall. The tuneable waveguide structure comprises at least one tuning device, where each tuning device comprises a wall part. Each wall part comprises one of the first inner wall and the second inner wall and is movably arranged along an extension that is perpendicular to the intended extension of the electrical field.

BACKGROUND

In wireless microwave links, radios are equipped with microwave filters, a typical example of such a filter is a diplexer between antenna, transmitter and receiver. These filters have to be adjusted to different frequencies within a band; this is today made in the assembly factory or by subcontractors. It would be desirable to allow a customer to set the frequency after the equipment is installed, and also to have the opportunity to change the frequency during the life of the product.

Electrical tuning of waveguide E-plane filters for radio communication is a well-known technology. By way of example, pin diodes, varactor diodes or ferroelectrics can be used to set the correct frequency. The usual way to implement electrical tuning devices in a waveguide is to vary the capacitive and inductive coupling in the waveguide and also to design additional structures in the waveguide to concentrate the electric field to the position where the tuning device is placed such as insertion of dielectric materials.

However, tuning of waveguide filters and other waveguide structures using pin diodes, ferroelectrics etc., will affect the general electrical performance of the waveguide filter in a negative way. One of the absolute major problems is the resulting low effective Q-factor when for example using pin diodes or ferroelectric structures in a waveguide filter, which in turn results in high losses.

One way to obtain tuning of waveguide E-plane filters is described in WO 2012/016584, where at least one row of switches is used for creating a virtual wall that is possible to turn on and turn off. Such switches may for example be realized by means of MEMS (Micro Electro Mechanical Systems). Such an arrangement provides a far better Q-factor than previous arrangements, but there is still a desire to obtain a less expensive tuneable waveguide E-plane filter with even better Q-factor.

There is thus a need for an enhanced waveguide tuning device that is as well as an enhanced electrically tuneable waveguide structure, where the enhancement manly relates to the Q-factor and manufacturing costs.

SUMMARY

The object of the present invention is to provide an enhanced waveguide tuning device that is as well as an enhanced electrically tuneable waveguide structure, where the enhancement mainly relates to the Q-factor, the accuracy, easy maneuvering and manufacturing costs.

This object is achieved by means of a tuneable waveguide structure having a longitudinal extension and comprising a first inner wall, a second inner wall, a third inner wall and a fourth inner wall. The inner walls are constituted by respective main surfaces and are electrically conducting, where the first inner wall and the second inner wall are facing each other, and where the third inner wall and the fourth inner wall are facing each other. The intended extension of the electrical field is parallel to the main surfaces of the first inner wall and the second inner wall, and the intended extension of the electrical field is perpendicular to the main surfaces of the third inner wall and the fourth inner wall. The tuneable waveguide structure comprises at least one tuning device, where each tuning device comprises a wall part. Each wall part comprises one of the first inner wall and the second inner wall and is movably arranged along an extension that is perpendicular to the intended extension of the electrical field.

According to a first aspect of the present invention, each tuning device comprises an adjustment arrangement that in turn comprises at least two support rods that at least indirectly are connected to the corresponding wall part. The adjustment arrangement further comprises a sloped surface for each support rod, where each sloped surface is in sliding engagement with a corresponding support rod and is laterally adjustable in the extension of the slope.

According to a second aspect of the present invention, each tuning device comprises a support part that is arranged to support the wall part, where the wall part is in the form of an electrically conducting foil that is in electrical contact with the third inner wall and the fourth inner wall. The support part is connected to the adjustment arrangement that is arranged to displace the support part along an extension that is perpendicular to the intended extension of the electrical field.

According to an example, the support part comprises moveable parts and intermediate parts which are positioned between and beside the moveable parts. Each moveable part is connected to a corresponding support rod, where at least one sloped surface is arranged with a slope rate that differs from the other.

According to another example, each sloped surface is comprised in corresponding slope block and is connected to a slide bar that in turn is connected to a screw drive arrangement, where a rotational movement of at least a part of the screw drive arrangement) is arranged to displace the slide bar.

According to another example, the screw drive arrangement comprises an electrical motor that is arranged to run a screw gear that in turn is arranged to displace the slide bar.

According to another example, the electrically conducting foil is attached to the third inner wall and the fourth inner wall. As an alternative for obtaining electrical contact between the electrically conducting foil and the adjacent third inner wall and the fourth inner wall, the electrically conducting foil may comprise contact fingers that are resiliently electrically contacting the third inner wall and the fourth inner wall.

Other examples are evident from the dependent claims.

A number of advantages are obtained by means of the present invention, for example:

high Q-factor,
lowered manufacturing costs,
only one type of component needed
low loss, and
a desired accurate tuning range.

BRIEF DESCRIPTION OF THE DRAWINGS

The present invention will now be described more in detail with reference to the appended drawings, where.

DETAILED DESCRIPTION

In the following, with reference to FIG. 1, FIG. 2, FIG. 3 and FIG. 4, a general E-plane filter will be briefly described.

Figure 1:
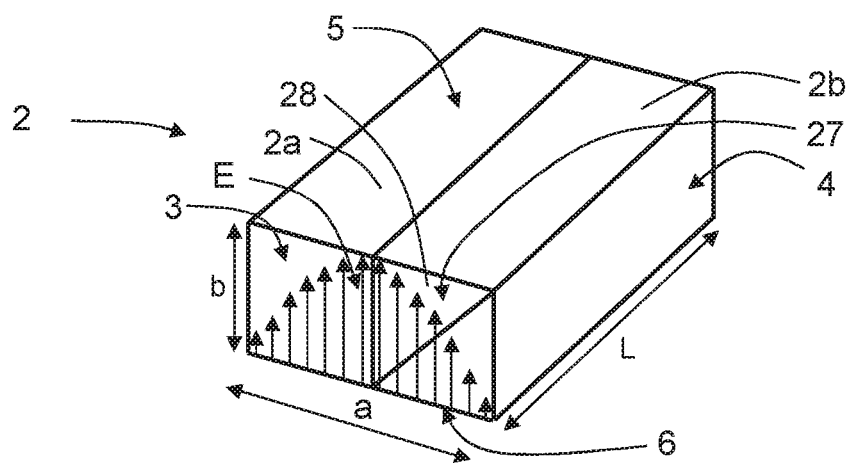
FIG. 1 shows a schematic perspective view of an E-plane waveguide filter, only showing the inner walls.

With reference to FIG. 1, showing a schematic perspective view of an E-plane filter, there is a tuneable waveguide structure 2 in the form of an E-plane filter having a longitudinal extension L and comprising a first inner wall 3, a second inner wall 4, a third inner wall 5 and a fourth inner wall 6. For reasons of clarity, only the inner walls are indicated in FIG. 1.

Figure 3:
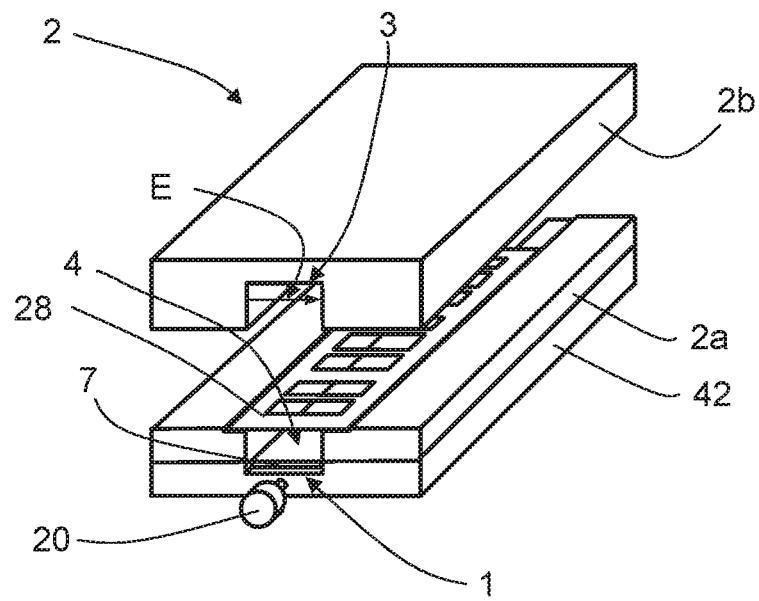
FIG. 3 shows a schematic perspective view of a second assembly step of an E-plane filter with the tuning device.
Figure 4:
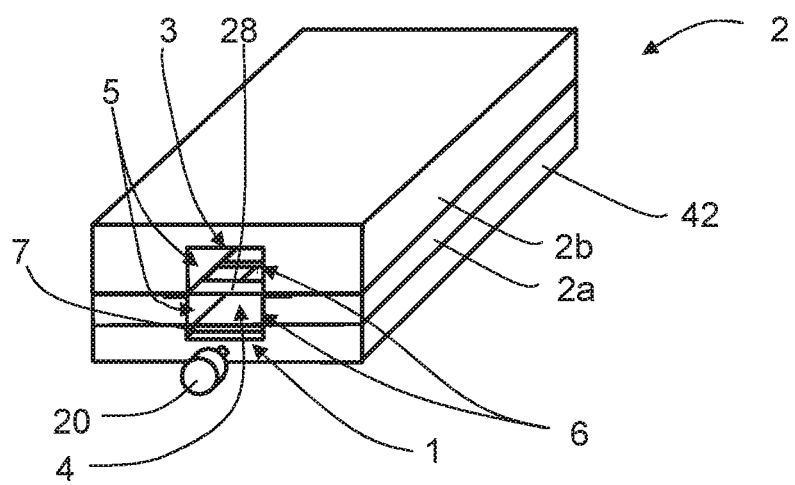
FIG. 4 shows a schematic perspective view of a third assembly step of an E-plane filter with the tuning device.

The inner walls 3, 4, 5, 6 are constituted by respective main surfaces and are electrically conducting, the inner walls 3, 4, 5, 6 furthermore being arranged such that a rectangular cross-section comprising an opening 27 is obtained for the waveguide structure 2. The first inner wall 3 and the second inner wall 4 have a first length b in the rectangular cross-section and are facing each other. In a similar way, the third inner wall 5 and the fourth inner wall 6 have a second length a in the rectangular cross-section and are facing each other. The intended extension of the electrical field E is parallel to the main surfaces of the first inner wall 3 and the second inner wall 4. Furthermore, the intended extension of the electrical field E is perpendicular to the main surfaces of the third inner wall 5 and the fourth inner wall 6. Altering the second length a will alter the frequency characteristics of the E-plane filter FIG. 2 shows a schematic perspective view of a first assembly step of the E-plane filter, FIG. 3 shows a schematic perspective view of a second assembly step of the E-plane filter and FIG. 4 shows a schematic perspective view of a third assembly step of the E-plane filter.

The waveguide structure 2 comprises a first part 2a and a second part 2b. The first part 2a comprises the first inner wall 3, partly the third inner wall 5 and partly the fourth inner wall 6. The second part 2b comprises the second inner wall 4, partly the third inner wall 5 and partly the fourth inner wall 6. When the first part 2a and the second part 2b are mounted, as shown in FIG. 4, the third inner wall 5 and the fourth inner wall 6 are completed. Then also an electrically conducting filter foil 28 with a number of apertures 29, 30 is placed between the first part 2a and the second part 2b, running parallel to the first inner wall 3 and the second inner wall 4.

Figure 2:
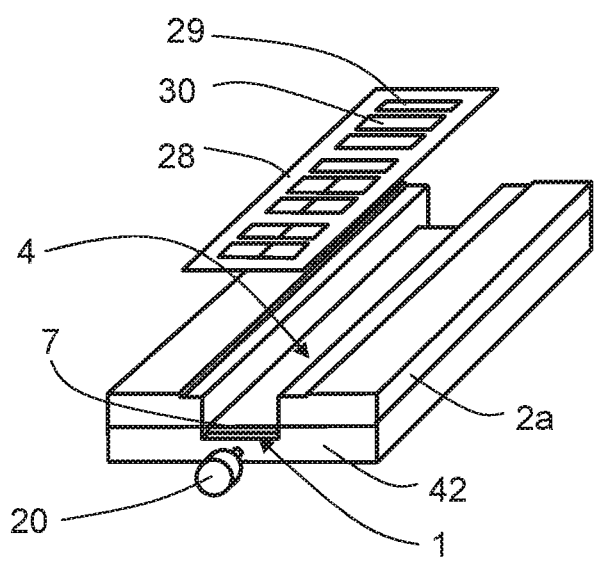
FIG. 2 shows a schematic perspective view of a first assembly step of an E-plane filter with a tuning device.

For reasons of clarity, only two apertures 29, 30 are denoted in FIG. 2. This is only an example; the forming of such a filter foil 28 is previously well-known to those skilled in the art, such that desired frequency characteristics of the filter is defined.

Figure 5:
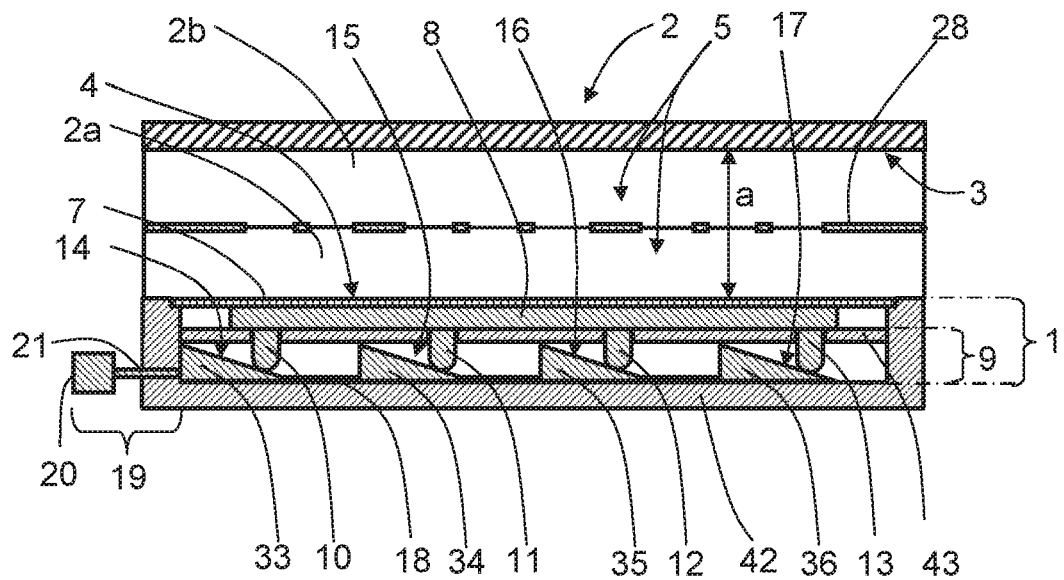
FIG. 5 shows a schematic sectional side view of a first example of an E-plane filter in a first position.
Figure 6:
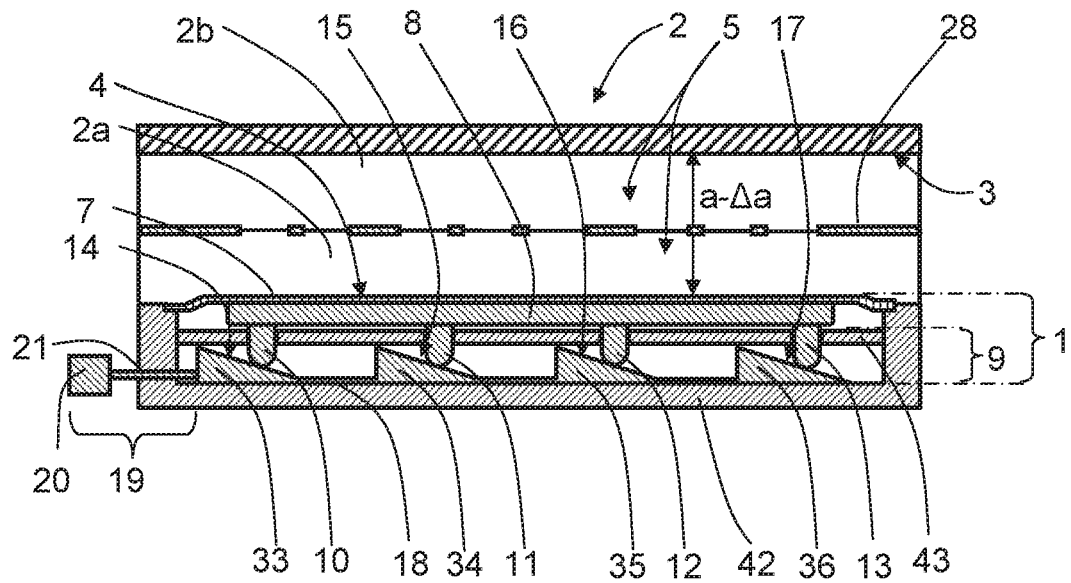
FIG. 6 shows a schematic sectional side view of a first example of an E-plane filter in a second position.

With reference also to FIG. 5 and FIG. 6 showing a sectional side view of the E-plane filter 2, the E-plane filter 2 comprises a tuning device 1 that comprises a wall part 7. The wall part 7 comprises the second inner wall 4, and is movably arranged along an extension that is perpendicular to the intended extension of the electrical field E. In this way, the second length a is adjustable. The tuning device 1 is positioned in a tuning housing 42. The tuning housing 42 could be formed to be integral with the first part 2a.

Figure 9:
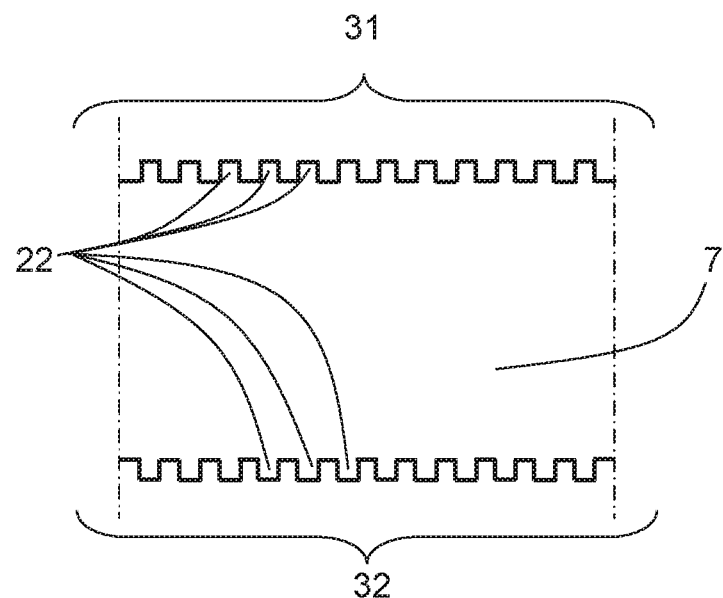
FIG. 9 shows a schematic partial top view of an electrically conducting foil with fingers.

According to a first example, the tuning device 1 furthermore comprises a support part 8 that is arranged to support the wall part 7. The wall part 7 is in the form of an electrically conducting foil 7 that is in electrical contact with the third inner wall 5 and the fourth inner wall 6. In order to ensure electrical contact, the electrically conducting foil 7 is attached to the third inner wall 5 and the fourth inner wall 6. Alternatively, as shown in FIG. 9, the electrically conducting foil 7 may comprise contact fingers 22 along those edges 31, 32 that are arranged to face the third inner wall 5 and the fourth inner wall 6, where these fingers 22 are arranged to resiliently electrically contacting the third inner wall 5 and the fourth inner wall 6.

According to the present invention, the tuning device 1 comprises an adjustment arrangement 9, where the support part 8 is connected to the adjustment arrangement 9 and where the adjustment arrangement 9 is arranged to displace the support part along an extension that is perpendicular to the intended extension of the electrical field E. In order to accomplish this displacement, the adjustment arrangement 9 comprises four support rods 10, 11, 12, 13 that are connected to the support part 8 and extend away from the first inner wall 3. The adjustment arrangement 9 further comprises four sloped surfaces 14, 15, 16, 17, one for each support rod 10, 11, 12, 13, each sloped surface 14, 15, 16, 17 being in sliding engagement with a corresponding support rod 10, 11, 12, 13 and being laterally adjustable in the extension of the slope.

Figure 7:
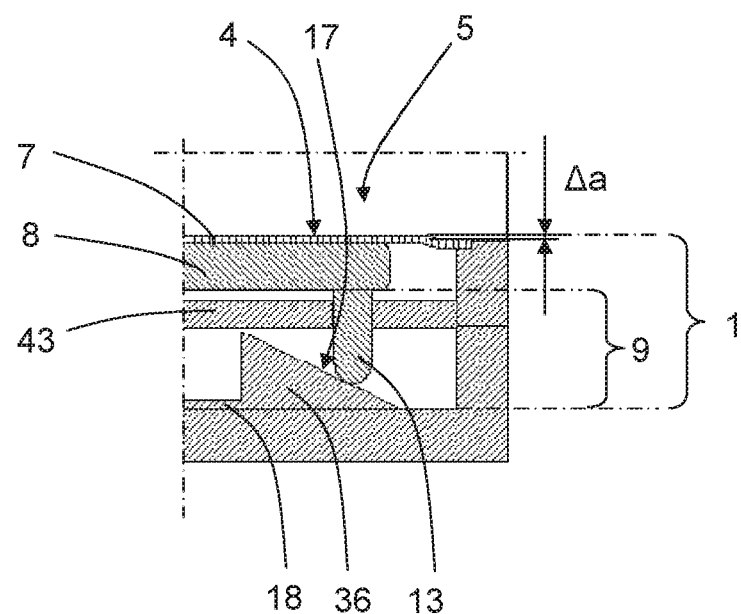
FIG. 7 shows an enlarged part of FIG. 6.

The sloped surfaces 14, 15, 16, 17 that are comprised in corresponding slope blocks 33, 34, 35, 36 are connected to a slide bar 18 that in turn is connected to a screw drive arrangement 19 that is comprised in the adjustment arrangement 9, where a rotational movement of a part of the screw drive arrangement 19 is arranged to laterally displace the slide bar 18. When the slide bar 18 is moved such that the support rods 10, 11, 12, 13 are displaced towards the first inner wall 3 by means of the sloped surfaces pressing the support rods in that direction, the second inner wall 4 is moved towards the first inner wall 3, which in turn decreases the second length a to a decreased value a-Δa as showed in FIG. 6. If the slide bar 18 then is moved in the opposite direction, the second length a-Δa will increase and ultimately will be returned to the original value a. The decrease of the second distance a with a certain distance Δa is illustrated in detail in FIG. 7.

In order to move the slide bar 18 in a controlled manner, the screw drive arrangement 19 comprises an electrical motor 20 that is arranged to run a screw gear 21 that in turn is arranged to displace the slide bar 18 with the slope blocks 33, 34, 35, 36. Alternatively, the screw drive arrangement may comprise a manual knob (not shown) arranged for a manual displacement of the slide bar 18 by rotating the manual knob.

The screw gear 21 may for example be constituted by a threaded rod that engage corresponding threads in an aperture in the tuning housing 42, this is for example suitable in the case of a manual knob.

Figure 10:
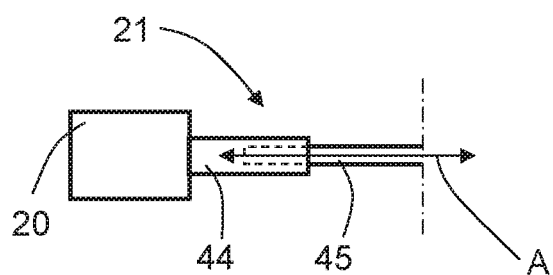
FIG. 10 shows a schematic side view of an electrical motor connected to a screw gear.

Alternatively, as shown in detail in FIG. 10, the screw gear 21 may comprise an outer housing 44 with internal threads and an inner rod 45 with outer threads, arranged to engage the inner threads of the outer housing 44. The outer housing 44 is connected to the electrical motor 20 and is arranged to be brought into rotation by the electrical motor 20.

When the outer housing 44 is rotated by the motor 20, the inner rod 45 is moved along its longitudinal extension, to and from the motor 20, as indicated with an arrow A. The inner rod 45 is connected to the slide bar 18 via an aperture in the tuning housing 42, preventing it from rotating along with the outer housing 44 and transferring its movement to the slide bar 18. The screw drive arrangement 19 may be more or less, or even completely, positioned within or outside the tuning housing 42.

Especially when the electrically conducting foil 7 is attached to the third inner wall 5 and the fourth inner wall 6, the electrically conducting foil 7 is arranged to allow a certain movement when the support part 8 is displaced; for example the electrically conducting foil 7 is resilient in its structure or comprises meandered sections that allow stretching without deformation or rupture. The electrically conducting foil 7 should always be subject to a certain pre-tension in order to have a well-defined wall part with a well-defined second inner wall 4. In this context, well-defined mainly refers to the second length a. A foil made as a thin plastic sheet to which an electrically conducting coating is applied may have resilient properties, allowing a certain non-deforming stretch to be performed, which then allows the foil to shrink back when the stretching is discontinued.

Figure 8:
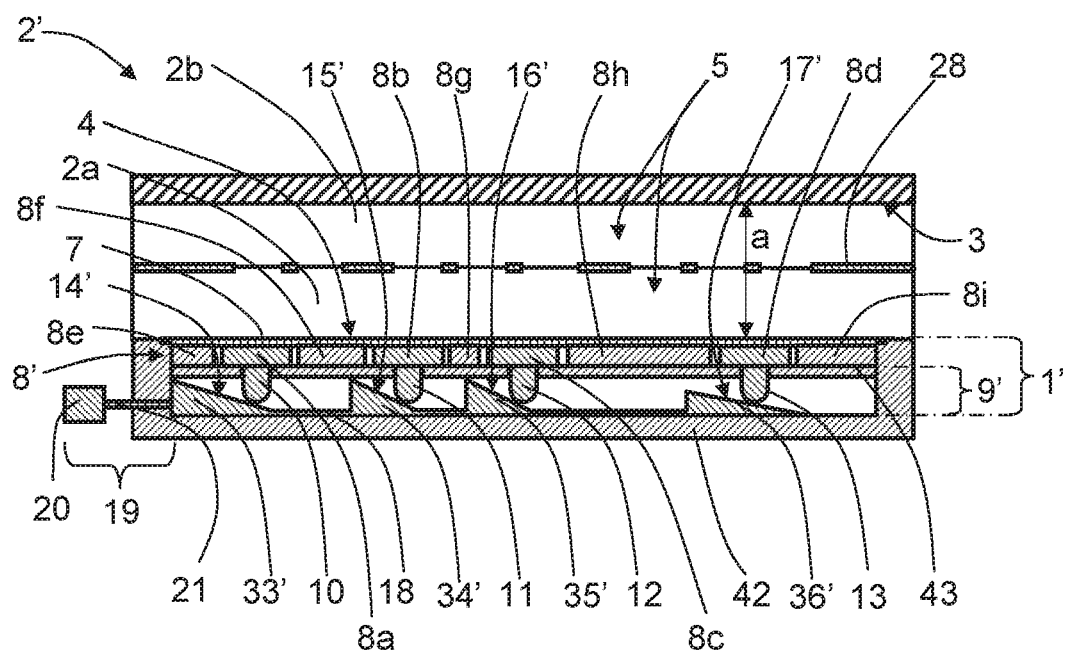
FIG. 8 shows a schematic sectional side view of a second example of an E-plane filter.

In FIG. 8, showing a sectional side view of the E-plane filter 2', a second example is shown. Here, the tuning device 1' comprises a support part 8' that in turn comprises a plurality of sub-parts which are arranged to support the wall part 7, where the wall part 7 also here is in the form of an electrically conducting foil 7 that is attached to the third inner wall 5 and the fourth inner wall 6.

The sub-parts comprise moveable parts 8a, 8b, 8c, 8d and intermediate parts 8e, 8f, 8g, 8h, 8i, each moveable part 8a, 8b, 8c, 8d being connected to an adjustment arrangement 9' that is arranged to displace the moveable parts 8a, 8b, 8c, 8d along an extension that is perpendicular to the intended extension of the electrical field E.

In order to accomplish this displacement, the adjustment arrangement comprises the four support rods 10, 11, 12, 13 that are connected to the moveable parts 8a, 8b, 8c, 8d and extend away from the first inner wall 3. There is one support rod 10, 11, 12, 13 for each moveable part 8a, 8b, 8c, 8d.

The adjustment arrangement further comprises four sloped surfaces 14', 15', 16', 17', one for each support rod 10, 11, 12, 13, each sloped surface 14', 15', 16', 17' being in sliding engagement with a corresponding support rod 10, 11, 12, 13, and being laterally adjustable in the extension of the slope as described for the first example. Furthermore, in this example, the sloped surfaces 14', 15', 16', 17' are arranged with different slope rates. Generally, at least one sloped surface 14', 15', 16', 17' is arranged with a slope rate that differs from the other.

As in the first example, the sloped surfaces 14', 15', 16', 17' are comprised in corresponding slope blocks 33', 34', 35', 36' that are connected to a slide bar 18 that in turn is connected to a screw drive arrangement 19. When the sloped surfaces 14', 15', 16', 17' are laterally displaced, the support rods 10, 11, 12, 13 are displaced towards the first inner wall 3 by means of the sloped surfaces 14', 15', 16', 17' pressing the support rods in that direction, resulting in that the second inner wall 4 is moved towards the first inner wall 3. Since the sloped surfaces 14', 15', 16', 17' are arranged with different slope rates, the support rods 10, 11, 12, 13 are displaced towards the first inner wall 3 to different extents, depending on the corresponding slope rates. This results in that the wall part 7 may be moved towards, or away from, the first inner wall 3 to different extents, resulting in that the second length a may vary along the longitudinal extension L.

The intermediate parts, 8e, 8f, 8g, 8h, 8i that suitable are attached to each other by means of a circumferentially running frame (not shown), are positioned between the moveable parts 8a, 8b, 8c, 8d and are used to keep the moveable parts 8a, 8b, 8c, 8d in place laterally.

The present invention is not limited to the examples discussed above, but may vary freely within the scope of the appended claims. For example, the sloped surfaces may have non-linear slope characteristics, for example hyperbolic or discontinuous. The sloped surfaces have been shown to be displaced laterally along the longitudinal extension L, but may be displaced in any suitable lateral extension. The support rods should be positioned such that they have positions that correspond to the sloped surfaces.

Other examples of how the wall part 7 is moved by means of the adjustment arrangement 9 are of course conceivable. For all examples, the movement may performed manually or electrically controlled. In the latter case, an electrical motor may be used, for example a step-motor that is driven digitally to discrete angular axial positions. An electrical control may for example be performed via an RJ45 or USB (Universal Serial Bus) connection, or wirelessly, for example via WiFi (Wireless Fidelity). A change of filter characteristic by means of wall displacement may be detected, such that desired filter characteristic may be obtained, either manually or automatically.

There should be at least one tuning device 1, in addition to the one described and being arranged for the second inner wall 4, there may also be a further tuning device arranged for the first inner wall 3. Such a further tuning device should be arranged in the same, or at least a similar, way as the tuning devices described.

The E-plane filter 2 is generally referred to as a tuneable waveguide structure 2.

The wall part may be made in a rigid electrically conducting sheet, or as a thinner foil, as described. All electrically conducting parts may be made as non-conducting part, for example plastic parts, that are covered with an electrically conducting coating. An example of a plastic material is polyamide or LCP (Liquid Crystal Polymer), and the electrical coating may for example be made in copper or silver. Other materials and combinations of materials is of course conceivable.

The use of support rods and corresponding sloped surfaces is advantageous, since this arrangement in combination with a screw gear allows a very fine tuning to be performed. There should be at least two support rods and thus at least two corresponding sloped surfaces.

The distance between the support rods may differ, as for example depicted in FIG. 8. Corresponding slope surfaces, cams or the like are positioned correspondingly.

The support part 8, or the moveable parts 8a, 8b, 8c, 8d may either be attached to the wall part 7, or may just be in contact with each other. In order to guide the support rods 10, 11, 12, 13, a guiding plate 43 may be positioned such that the support rods 10, 11, 12, 13 run through corresponding apertures in the guiding plate 43.

The support part 8 is not necessary, for example the wall part 7 may be directly connected to an adjustment arrangement 9, the wall part then being made as a rigid part that is arranged to make electrical contact with the third inner wall 5 and the fourth inner wall 6, for example by means of spring-loaded balls that are comprised in the wall part and arranged to be resiliently pressed against the third inner wall 5 and the fourth inner wall 6. Generally, each wall part 7 is at least indirectly connected to an adjustment arrangement 9.

The present invention thus relates to a tuning device that comprises at least one wall part 7 that is movably arranged along an extension that is perpendicular to the intended extension of the electrical field E. Each wall part 7 is at least indirectly connected to an adjustment arrangement 9 that comprises at least two support rods 10, 11, 12, 13 that are connected to the support part 8 and extend away from the first inner wall 3. The adjustment arrangement 9 further comprises a sloped surface 14, 15, 16, 17 for each support rod 10, 11, 12, 13, where each sloped surface 14, 15, 16, 17 is in sliding engagement with a corresponding support rod 10, 11, 12, 13 and also is laterally adjustable in the extension of the slope. The wall part may of any suitable type that is arranged to make electrical contact with the third inner wall 5 and the fourth inner wall 6.

The present invention also relates to a tuning device that comprises at least one wall part 7 that is movably arranged along an extension that is perpendicular to the intended extension of the electrical field E. Each tuning device 1 comprises a support part 8 that is arranged to support the wall part 7, where the wall part 7 here is in the form of an electrically conducting foil that is in electrical contact with the third inner wall 5 and the fourth inner wall 6. The support part 8 is connected to an adjustment arrangement 9 that is arranged to displace the support part 8 along an extension that is perpendicular to the intended extension of the electrical field E. The adjustment arrangement 9 may be of any suitable type, for example the sloped surfaces 14, 15, 16, 17 which are in sliding engagement with corresponding support rods 10, 11, 12, 13 as mentioned above. Other adjustment arrangements are conceivable, such as for example screws that directly affect each moveable wall part.

The invention claimed is:

1. A tuneable waveguide structure having a longitudinal extension and comprising:
   a first inner wall, a second inner wall, a third inner wall and a fourth inner wall,
   the inner walls being constituted by respective main surfaces and being electrically conducting,
   where the first inner wall and the second inner wall are facing each other,
   where the third inner wall and the fourth inner wall are facing each other,
   where the intended direction of the electrical field is parallel to the main surfaces of the first inner wall and the second inner wall
   where the intended direction of the electrical field is perpendicular to the main surfaces of the third inner wall and the fourth inner wall,
   where the tuneable waveguide structure comprises at least one tuning device,
   where said at least one tuning device comprises a wall part, and
   where said wall part comprises one of the first inner wall and the second inner wall,
   where said wall part is movably arranged in a direction that is perpendicular to the intended direction of the electrical field and substantially perpendicular to the longitudinal extension,
   wherein said at least one tuning device comprises an adjustment arrangement that in turn comprises at least two support rods that at least indirectly are connected to said wall part,
   where the adjustment arrangement further comprises a sloped surface for each of said support rods, each of said sloped surfaces being movably arranged in relation to the inner walls and in sliding engagement with a corresponding one of said support rods and such that a movement of a respective sloped surface is translated to a movement of the corresponding rod.

2. A tuneable waveguide structure according to claim 1, wherein:
   each of said at least one tuning device comprises a support part that is arranged to support the wall part
   the wall part is in the form of an electrically conducting foil that is in electrical contact with the third inner wall and the fourth inner wall, and
   the support part is connected to the adjustment arrangement.

3. A tuneable waveguide structure according to claim 2, wherein the support part comprises moveable parts and intermediate parts which are positioned between and beside the moveable parts, each of said moveable parts being connected to a corresponding one of said support rods where at least one sloped surface of the sloped surfaces is arranged with a slope rate that differs from the other.

4. A tuneable waveguide structure according to claim 2 wherein each of said sloped surfaces of the sloped surfaces are comprised in a corresponding slope block and is connected to a slide bar that in turn is connected to a screw drive arrangement, where a rotational movement of at least a part of the screw drive arrangement is arranged to displace the slide bar.

5. A tuneable waveguide structure according to claim 4, wherein the screw drive arrangement comprises an electrical motor that is arranged to run a screw gear that in turn is arranged to displace the slide bar.

6. A tuneable waveguide structure according to claim 5, wherein:
   the screw gear comprises an outer housing with internal threads and an inner rod with outer threads, arranged to engage the inner threads of the outer housing,
   the outer housing is connected to the electrical motor and is arranged to be brought into rotation by the electrical motor, and
   the inner rod is connected to the slide bar and is arranged to move when the outer housing is rotated by the motor.

7. A tuneable waveguide structure according to claim 2 wherein the electrically conducting foil is attached to the third inner wall and the fourth inner wall.

8. A tuneable waveguide structure according to claim 2 wherein the electrically conducting foil comprises contact fingers that are resiliently electrically contacting the third inner wall and the fourth inner wall.

9. A tuneable waveguide structure according to claim 2 wherein the adjustment arrangement further comprises a guiding plate arranged to guide the support rods, the support rods being arranged to run through corresponding apertures in the guiding plate.

10. A tuneable waveguide structure according to claim 2 wherein at least one of the sloped surfaces has non-linear slope characteristics.

11. A tuneable waveguide structure according to claim 2 wherein the support part comprises moveable parts and intermediate parts which are positioned between and beside the moveable parts, each of said moveable parts being connected to a corresponding one of said support rods where at least two sloped surfaces of the sloped surfaces are arranged with slope rates that differ from one another.

12. A tuneable waveguide according to claim 2, wherein the electrically conducting foil is resilient or comprises meandered sections that allow stretching without deformation or rupture.

13. A tuneable waveguide according to claim 2, further comprising an electrically conducting filter foil dividing the waveguide, having a number of apertures, and running parallel to the first inner wall and the second inner wall.

14. A tuneable waveguide according to claim 12 wherein the electrically conducting filter foil is arranged in a plane parallel to the intended direction of the electrical field.

* * * * *